Figure 4:
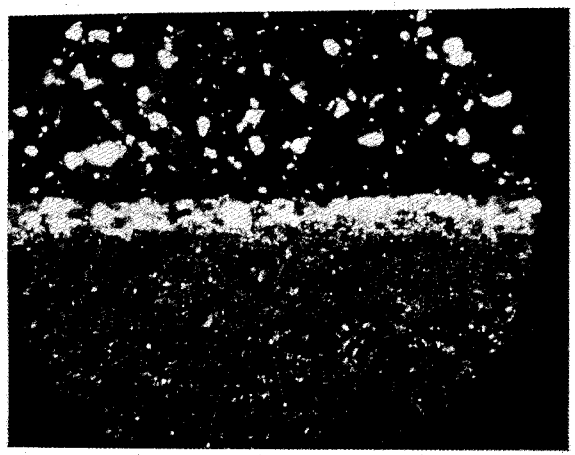

| GROUP | MATERIAL | CHEMICAL SYMBOL | CRYSTAL CLASS (Shoenflies System) | CHEMICAL GRADE |
|---|---|---|---|---|
| 1 | Beryl | $3BeO \cdot Al_2O_3 \cdot 6SiO_2$ | $D_{6h}^2$ | Commercial |
| | Mullite | $3Al_2O_3 \cdot 2SiO_2$ | Unknown | Commercial |
| | Potassium Feldspar | $K_2O \cdot Al_2O_3 \cdot 6SiO_2$ | $C_{2h}^3$ | Technical |
| | Spodumene | $Li_2O \cdot Al_2O_3 \cdot 4SiO_2$ | Unknown | Commercial |
| | Zinc Zirconium Silicate | $ZnO \cdot ZrO_2 \cdot SiO_2$ | Unknown | Technical |
| | Calcium Zirconium Silicate | $CaO \cdot ZrO_2 \cdot SiO_2$ | Unknown | Technical |
| | Barium Zirconate | $BaO \cdot ZrO_2$ | Unknown | Technical |
| 2 A | Silicon | Si | $O_h^7$ | Technical |
| | Aluminum | Al | $O_h^5$ | Commercial |
| | Chromium | Cr | $O_h^9$ | Commercial |
| | Iron | Fe | $O_h^9$ | Commercial |
| | Nickel | Ni | $D_{6h}^4$ | Commercial |
| | Cobalt | Co | $D_{6h}^4$ | Commercial |
| 2 B | Cobalt Oxide | $Co_3O_4$ | $O_h^7$ | Technical |
| | Cuprous Oxide | $Cu_2O$ | $O_h^4$ | Technical |
| | Chromic Oxide | $Cr_2O_3$ | $D_{3d}^6$ | Technical |
| | Iron Oxide (Magnetite) | $Fe_3O_4$ | $O_h^7$ | Technical |
| | Iron Oxide (Hematite) | $Fe_2O_3$ | $D_{3d}^6$ | Commercial |
| | Manganous Oxide | MnO | $O_h^5$ | Commercial |
| | Nickel Oxide | NiO | $O_h^5$ | Technical |

*Fig. 1*

Inventor
John V. Long

| GROUP | MATERIAL | CHEMICAL SYMBOL | CRYSTAL CLASS (Shoenflies System) | CHEMICAL GRADE |
|---|---|---|---|---|
| 3 | Zirconium Dioxide | $ZrO_2$ | $O_h^5$ | Technical |
| | Aluminum Oxide | $Al_2O_3$ | $O_h^7$ | Technical |
| | Titanium Dioxide | $TiO_2$ | $D_{4h}^{19}$ | Technical |
| | Zircon | $ZrSiO_4$ | $D_{4h}^{19}$ | Commercial |
| | Tin Oxide (Stannic) | $SnO_2$ | $D_{4h}^{19}$ | Technical |
| | Beryllium Oxide | $BeO$ | $C_{6v}^4$ | Commercial |
| | Silicon Carbide | $SiC$ | $C_{6v}^4$ | Commercial |
| | Zinc Oxide | $ZnO$ | $C_{6v}^4$ | Technical |
| 4 | Silica (Quartz) | $SiO_2$ | $D_3^4$ or $D_3^6$ | Commercial |
| | Boron Oxide | $B_2O_3$ | Unknown | Technical |
| | Phosphoric Pentoxide | $P_2O_5$ | $C_{2v}^{19}$ | Technical |
| 5 | Lithium Fluoride | $LiF$ | $O_h^5$ | Technical |
| | Sodium Fluoride | $NaF$ | $O_h^5$ | Technical |
| | Potassium Fluoride | $KF$ | $O_h^5$ | Technical |
| | Calcium Fluoride | $CaF_2$ | $O_h^5$ | Technical |
| | Magnesium Oxide | $MgO$ | $O_h^5$ | Technical |
| | Calcium Oxide | $CaO$ | $O_h^5$ | Technical |
| | Molybdenum Dioxide | $MoO_2$ | $D_{4h}^{14}$ | Technical |

Fig. 1-A

Inventor
John V. Long

July 15, 1958     J. V. LONG     2,843,507
CERAMIC COATINGS AND METHODS OF FORMULATION
Original Filed Dec. 15, 1949     8 Sheets-Sheet 3

Fig. 2

INVENTOR
John V. Long
By Strauch, Nolan
& Diggins
Attorneys

Fig. 2-A

July 15, 1958     J. V. LONG     2,843,507
CERAMIC COATINGS AND METHODS OF FORMULATION
Original Filed Dec. 15, 1949     8 Sheets-Sheet 5

TYPICAL COATINGS AND TEST DATA

| MATERIAL | *COATING NUMBER | FIRING TEMPERATURE (°F) | FIRING TIME (Minutes) | TOTAL COATING THICKNESS (inches) | A. M. C. TEST |
|---|---|---|---|---|---|
| AISI 1010 STEEL | S5 | 2200 | 10 | .002 | 120 hours at 1600°F |
| AISI 1010 STEEL | S8 + S29 | 2200 | 20 | .003 | 72 hours at 1600°F |
| AISI 1020 STEEL | S8 + S24 | 2200 | 10 | .003 | 72 hours at 1600°F |
| AISI 1010 STEEL | S45 | 2100 | 20 | .0015 | 72 hours at 1600°F |
| AISI 1030 STEEL | S30 + S31 | 2100 | 10 | .0025 | 72 hours at 1700°F |
| AISI 4130 STEEL | S30 + S31 | 2100 | 10 | .002 | 72 hours at 1700°F |
| AISI 347 STEEL | S41 + S42 | 1900 | 5 | .001 | 72 hours at 1700°F |
| AISI 347 STEEL | S38 | 1900 | 5 | .0015 | 72 hours at 1800°F |
| AISI 310 STEEL | S41 + S43 | 1900 | 5 | .002 | 72 hours at 1700°F |
| AISI 314 STEEL | S41 + S43 | 2300 | 10 | .0015 | 72 hours at 1800°F |
| AISI 314 STEEL | S9 | 2300 | 10 | .00075 | 72 hours at 1850°F |
| AISI 314 STEEL | S28 | 2250 | 10 | .00075 | 72 hours at 1850°F |
| Inconel | S39 + S32 | 1900 | 5 | .0015 | 72 hours at 1800°F |
| N155 (STELLITE) | S34 | 2050 | 10 | .001 | 72 hours at 1850°F |
| S-816 (Allegheny-Ludlum) | S34 | 2050 | 10 | .001 | 72 hours at 1850°F |
| Vitallium | S44 | 2100 | 3 | .0025 | 72 hours at 1800°F |
| Vitallium | S35 | 2000 | 5 | .0025 | 72 hours at 1800°F |
| Hastelloy B | S44 | 2100 | 3 | .0025 | 72 hours at 1850°F |
| Hastelloy B | S47 | 2000 | 5 | .0025 | 72 hours at 1850°F |

\* Explanation of Coating Combinations

S8 + S29    indicates double coat, single firing, i.e., S8 applied, then S29 applied, then fired { S9, S28 } indicates two single coats, each fired seperately, i.e., S9 applied and fired, then S28 applied and fired

Fig. 3

Inventor
John V. Long

By Strauch, Nolan & Diggins
Attorneys

INVENTOR
John V. Long
By
Strauch, Nolan + Diggins
Attorneys

July 15, 1958   J. V. LONG   2,843,507
CERAMIC COATINGS AND METHODS OF FORMULATION
Original Filed Dec. 15, 1949   8 Sheets-Sheet 8

INVENTOR
John V. Long
BY
Attorneys

2,843,507

CERAMIC COATINGS AND METHODS OF FORMULATION

John V. Long, San Diego, Calif., assignor to Solar Aircraft Company, San Diego, Calif., a corporation of California Continuation of application Serial No. 133,045, December 15, 1949. This application August 31, 1953, Serial No. 377,381

18 Claims. (Cl. 117—129)

The present discovery and invention relate to improved compositions of matter and methods of their production, and more particularly to new protective layers and coatings of the ceramic or enamel type for metals and alloys; said layers and coatings having qualities of thinness, adherence, thermal and mechanical shock resistance, and latitude and simplicity of coating formulation, heretofore unattainable in prior ceramic and enamel coatings.

Historically the origin of the art of enameling and ceramic coating of metals is lost in antiquity. Examples of enamel coated metal jewelry date back to the fourth century B. C. For the past century commercial iron and sheet metal enameling for protective and ornamental purposes has been highly developed, and research in this field has been particularly active from the beginning of the present century, and rapidly accelerated in efforts to meet the needs of the two world wars.

For a number of years the exhaust manifolds of certain automobile engines have been coated with the conventional type of glossy porcelain enamel to prolong their lives. These were, however, unsatisfactory for airplane exhaust manifolds which operated at temperatures of the order of 1000° F.; and it accordingly became the practice to make airplane exhaust manifolds of heat resistant nickel-chrome alloys.

Also since early in 1942 designers of high temperature systems, particularly jet engines, rockets, gas turbine power plants, heat exchangers, etc., have encountered serious materials problems, because available metals and alloys lack corrosion and oxidation resistance in the temperature range above 1500° F. The military needs and rivalries requiring increased thermal efficiencies, and prolongation of the life of such high temperature devices, have created an additional urgent demand for better materials and/or methods by which currently used materials can be protected in such uses. A solution of these problems appeared to lie in developing high temperature protective ceramic coatings with the required properties to increase corrosion and oxidation resistance, and to enhance metal stability at higher temperatures. In addition, it appeared that ceramic coatings could be used on low temperature alloys made of readily available materials, which normally lacked high temperature corrosion and oxidation resistance, to permit their substitution for strategic materials.

For some years past, intensive direct government and government subsidized development and private development of such coatings has been under way both in this country and abroad. In this country such developments have been particularly active at the United States National Bureau of Standards, the department of Ceramic Engineering of the University of Illinois, the Ohio State University Research Foundation, Armour Research Foundation of the Illinois Institute of Technology, Rutgers University, Battelle Memorial Institute, New York State College of Ceramics and others, in co-operation with the United States Air Materiel Command, United States Naval Research, the United States Army Ordnance department and Tank Automotive Center, the National Advisory Sommittee for Aeronautics, and the Porcelain Enamel Institute. These organizations have investigated means of providing oxidation and corrosion resistance for metals and alloys by utilizing known principles of enamel formulation to extend the temperature range of previously developed enamels for low temperature applications.

In spite of the vast amount of research and development, including the extensive Government direct and subsidized research carried on in this field, the prior commercial enamel and ceramic coatings for metals have in general required the use of separate base coats to secure adherence to the metal to be coated, and outer coatings to secure reasonable protective properties, and require complex formulations with comparatively thick applications, and the finished coatings have relatively poor adherence, poor protective qualities particularly at elevated temperatures, and poor thermal and mechanical shock resistance. In particular, a strong persistent demand by designers of lightweight, high power, high temperature equipment for coatings applied in very thin layers (in the range of .0005 to .003 of an inch in thickness) which have high thermal and mechanical shock resistance, and which will provide corrosion and oxidation protection for extended periods of service life at temperatures above 1500° F. has not been met by the prior art. Various prior efforts and failures to supply this demand even with the extensive government subsidized research are noted in the papers read at the Conference on Ceramic Materials for Application to Aircraft Power Plants sponsored by the Headquarters Air Materiel Command, Wright-Patterson Air Force Base, Dayton, Ohio, on May 27 and May 28, 1948.

Coatings applied in very thin layers are quite important, for example, on gas turbine blades in which distortion of the air foil cannot be tolerated, in reduction of weight of jet engine parts, and in coating extremely thin edges, all types of welds, and combinations of various metal thicknesses. Thinness is also a substantial factor in better adherence which eliminates cracking, chipping, spalling and damages done by flying ceramic particles which may be considerable in high speed gas turbines and the like when comparatively thick coatings are used.

Accordingly, a primary object of my invention is the provision of novel simplified methods of formulating and compounding protective compositions of matter which, when applied in very thin layers to metals and their alloys, have considerably improved thermal and mechanical shock resistance, high oxidation and corrosion resistance at very high temperatures, and other desirable properties heretofore unattainable in protective ceramic and enamel coatings, and which provide those skilled in the ceramic arts with wide latitude in selection of materials to produce desired properties in formulating or compounding improved portective layers for metals and alloys.

Another object of my present invention is to provide protective compositions of matter which may be simply formulated and which, when formed on or applied to the surfaces of metals, such as iron, steel, molybdenum, nickel, chromium, cobalt, tantalum, tungsten, etc., and their alloys, will provide very thin, impervious, highly refractory, corrosion and oxidation resistant layers of surface compositions which are tightly bonded to the base material, and are of exceptional mechanical and thermal shock resistance, and which do not materially increase the weight of the protected objects, are highly useful at normal temperatures, and provide prolonged life at elevated temperatures.

A further object of my invention is to provide novel compositions of matter which in very thin layers give substantial protection to materials of the foregoing types for extended periods of service life against oxidation and corrosion above 1500° F.

Another object of my invention is to provide protective compositions of simplified formulation, and producible with simplified manufacturing controls, which may be formed on the surfaces of the material to be protected in thicknesses of the order of .0005 to .003 of an inch, and which will adhere to extremely thin and raw metal and alloy edges, to all types of welds, and to combinations of various metal thicknesses, without cracking, chipping or spalling under severe mechanical and thermal shock.

It is a further object of the invention to provide a novel process for protectively coating metallic surfaces involving the selection of coating material ingredients that all have substantially the same crystal structure and which when combined and fired upon a metallic surface develop at the metallic surface a final crystal structure that is substantially the same as that of the normal surface layer of the metal.

A further object of the invention is to provide a novel process for coating metallic surfaces wherein materials that possess the same or very nearly the same crystal structure as the oxides that are normally formed on such metallic surfaces are thermally bonded to the surfaces.

Other objects of my invention will appear from the following disclosure of preferred embodiments thereof and from the appended claims. Referring to the drawings:

Figures 1 and 1A comprise a tabulation of metals and ceramic raw materials which I have so far found available for use in the formulation of my improved protective compositions, and are illustrative of the types and characteristics of the materials that may be used in carrying out my invention and discovery. This tabulation indicates materials, chemical symbol, chemical grade, and crystal class of such materials, where presently known or readily available in the literature, according to Shoenflies system of designation. Materials are listed generally according to their functions in several groups as follows:

*Group 1.*—Complex minerals which increase stability and durability of coatings and comprised in general of complex compounds made up of materials listed in Groups 2–5, inclusive.

*Group 2A.*—Metals which have been used in high temperature alloys which increase adherence and thermal shock resistance of my improved compositions.

*Group 2B.*—Oxides of metals which have been used in high temperature alloys which increase adherence and thermal shock resistance of my improved compositions.

*Group 3.*—Oxides which may be classed as partial glass network formers or which increase the durability of glasses.

*Group 4.*—Oxides which are definitely known to form glasses.

*Group 5.*—Materials which produce fluxing action or are so-called glass modifiers.

Figures 2 and 2A comprise a tabulation of some specific examples of typical protective compositions formulated from materials of the various groups of Figure 1 in accordance with my invention and discovery, numbered consecutively for convenient reference hereinafter. Amounts of constituents are given by relative weight.

Figure 3 is a tabulation of illustrative examples of my best coating applications which have so far been formulated, applied and tested on the various listed metals and alloys, with firing temperatures and times, and A. M. C. test data.

Figures 4 to 11 are photomicrographs of typical compositions formed on base materials of AISI steel alloys 1010, 347, 310, 314; Inconel; (Vitallium); and the Allegheny Ludlum cobalt-chromium-nickel alloy known under the designation S–816.

Figures 4 to 11, inclusive, of the drawings are reproductions of actual photomicrographs of sections through specimens comprising a metal base having a ceramic coating formulated and applied thereto according to the principles of the present invention. These micrographs were made with plane-polarized illumination since, under light the ceramic coating, being somewhat translucent would record dimly or not at all. Due to the polarized light, the metal in each case appears quite dark and the etched areas of the metal and grain boundaries are exaggerated as are dirt, grease, and other foreign matter.

Figure 4 is a 100 power magnification and shows, from top to bottom, the Bakelite (used to hold the specimen), the ceramic layer, areas of diffusion at the ceramic-metal interface, and the base metal with the dark areas being matrix and the light areas natural inclusions (sulphides, silicates, etc.). In this as well as the remaining figures, the Bakelite appearing at the top of each photograph contains light splotches which are ceramic and/or abrasive particles embedded therein during the grinding and polishing of the specimen.

Figure 5:

In Figure 5 (250×) the interface between the metal base and ceramic layer shows a fairly continuous dark line, separating the ceramic layer from the interdiffusion zone. The light areas appearing in the metal base are caused by etched pits. Because the ceramic is harder than the metal, it is difficult to polish the specimens to an absolutely flat plane and, therefore, in some pictures either the metal or the ceramic is slightly out of focus. In this particular photograph, the metal is sufficiently out of focus to exaggerate the etched pits.

Figure 6:

Figure 6 (250×) is one of the better showings of the diffusion areas. The grain boundaries are clearly outlined because the metal is very slightly out of focus. As a hypothetical point, if, before this specimen was etched, the layer of ceramic could have been put on the metal area, then the etch cycle completed, and the ceramic removed before this micrograph was taken, the grain boundaries would not be visible because no etching action could have taken place through the ceramic coating.

Figure 7:
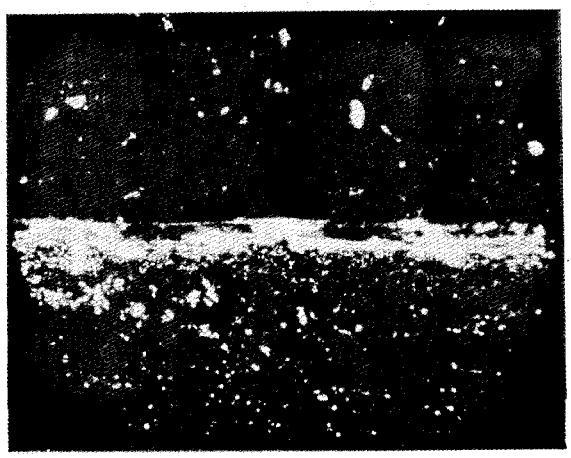

In Figure 7 (100×) is also a good showing of the diffusion layer joining the ceramic coat and metal base.

Figure 8:
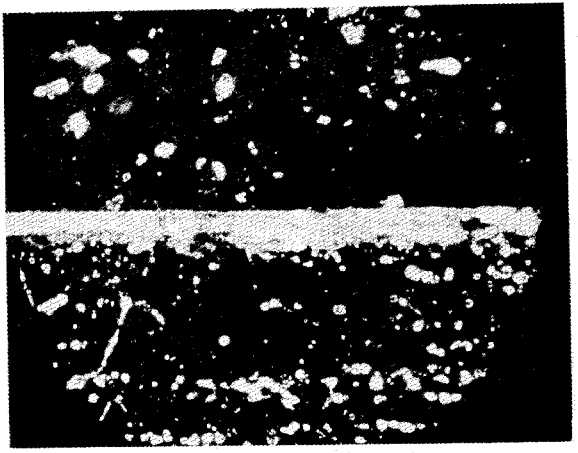

In Figure 8 (100×) the metal is slightly out of focus and therefore the inner metallic compounds are exaggerated but the ceramic coating shows quite clearly.

Figure 9:
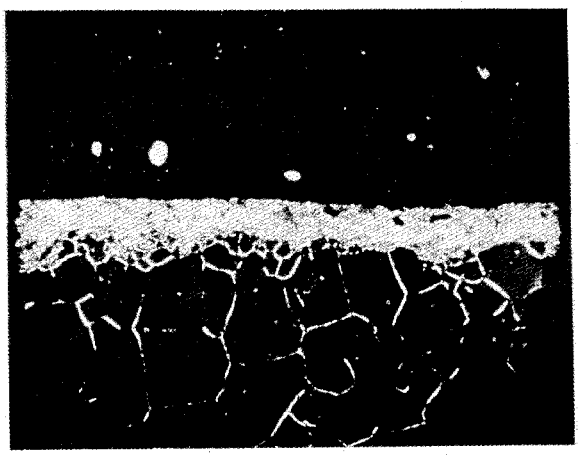

Figure 9 (100×), the ceramic is slightly out of focus while the metal is well in focus with good grain boundary delineation. As a result the diffusion area is not too obvious. It is to be understood, however, that while as in this photograph, the laminar zone of interdiffusion between metal and ceramic does not record obviously in all the photographs as compared, for example with Figure 6, this interdiffusion existed in all specimens tested.

Figure 10:
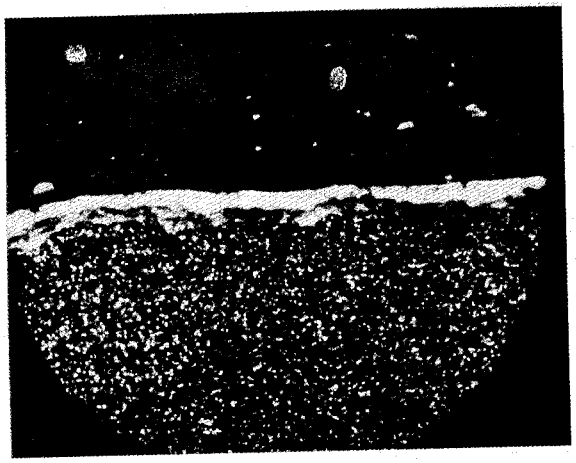

Figure 10 (100×) shows, as can be seen by the "spotty" appearance of the metal, one of the super alloys such as N–155 and S–816, the interdiffusion zone being clearly delineated at the interface although not so well defined as in Figure 6.

Figure 11:
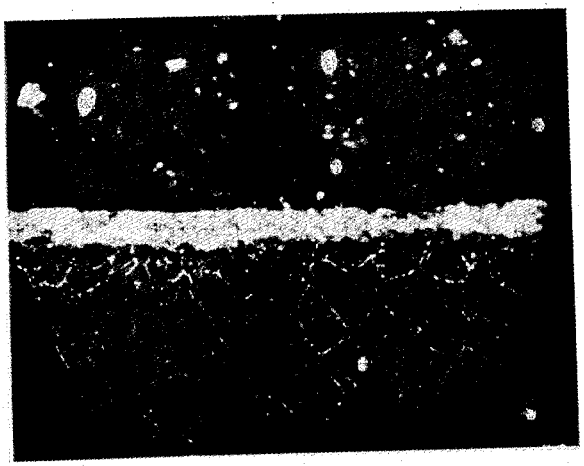

In Figure 11 as in Figure 9 the area of interdiffusion is not particularly well defined. However, both coat and metal are in excellent focus and the interface is particularly clear.

As best appears in Figure 6, it will be seen that the fired coatings of my invention form a layer bonded to the base metal by a laminar zone of interdiffusion of the ceramic and base materials. It has been found that the interdiffused layer at the interface remains even when the primary or external coating has been spalled off and that said interdiffused layer provides a substantial degree of protection for the base material. Thus it will be appreciated that a coated base is composed of three layers, namely, a first or structural layer consisting entirely of the base metal; a second or outer layer which is purely ceramic in nature, vitreous in appearance and crystalline or cryptocrystalline in structure; and, at the interface of the base metal and the coating, a third lamination consisting of interdiffused crystals of base and coating materials.

In other words a bond between the metal and coating is achieved by means of atomic lattice interfitting between the crystals thereof, the third lamination being in fact a combined bonding layer and secondary protective layer.

The basic concept of my invention comprises the discovery that it is possible to methodically, accurately and predictably select ingredients to be combined and fired in thin layers upon metallic surfaces, which combinations of ingredients develop in the final thermally bonded layer a crystalline or crypto-crystalline structure that is optimum for combination with the metallic surface. My understanding is that there is developed in the fired layer a crystal or like structure of such atomic space grouping as to have good lattice interfit with the crystal structure of the metallic surface. I have ascertained that any of a large number of ingredients are available for substitution in the combination in place of any of the ingredients, the substitute ingredients having similar crystal space groups, so that ingredients of the layer to be applied to a given metallic surface may be selected by those skilled in the ceramic arts and put together on the foregoing basis with due consideration for all special requirements of the final product to produce layers that are known to have maximum adherence and optimum protective values.

In carrying out the invention according to its preferred embodiment, I strive to replace the normal oxide coating of the metallic surface with a protective layer of superior properties. Hence the preferred technique is to select those ingredients which possess the crystal space grouping the same or nearly the same as the normal oxides, and which also are selected for the type of protection desired. The combination of ingredients is completed by this process of selection and then fired upon the surface. If different properties are required for certain conditions of operation, ingredients of appropriate properties may be substituted on the foregoing basis of related crystal structure.

With regard to the following disclosure, my present improved methods of formulation and my improved compositions are formed on my discovery that by utilization of the ceramic materials outlined in Figures 1 and 1A, crystalline or crypto-crystalline protective compositions are developed on firing which have good lattice fit between the protective surface layer and the metal or alloy to be protected, which are novel and have greatly improved protective qualities on the surfaces of the base materials, and which have highly useful, new and improved properties. For example, in treating oxidation resistant metals and alloys, I can form very thin surface layers of new protective materials having considerably improved refractoriness and oxidation resistance compared to the normal oxide films on such metals and alloys. My improved compositions may be combinations with such normal protective films to produce better ones, or may replace them, and can be applied as protective layers or films on base materials whose normal oxide coatings do not inhibit oxidation.

In carrying out my invention, I utilize mixtures of materials tabulated by groups according to function in Figures 1 and 1A and selected from the groups depending upon the coating characteristics desired. These selected materials are mixed in combinations, which when applied in thin layers to the metallic base materials to be protected and properly fired as hereinafter set forth in detail, develop crystal or crypto-crystalline structures having one or more axes comparable to the crystal axes of the base materials. As a result of extensive tests and experience with my improved compositions and their new and superior properties, I have developed a simplified theory that certain materials including those listed combine on firing to form solid solutions containing crystals with atomic spacings the same, or nearly the same, as that along the crystal edges of the base materials. And that binding of the protective layer to the base material is due to the lattice fit through the residual valence electrons or a rapid exchange of the electrons between the atoms of the protective layer and the free electrons in the base material. It is also my theory that electrostatic attraction may increase the bonding energy but that the union between my improved protective layer and the base material is more than likely somewhere between ionic and metallic, and consequently a homopolar or valence bond.

In any event, in accordance with my discovery and invention, I produce new outer protective layers on the base materials having various new and improved properties not present in prior protective coatings, including superior corrosion, mechanical and thermal shock resistance, and also superior bonding to and union with the base material. In many instances my improved protective layers may be hammered without chipping or spalling.

In carrying out my invention, I have discovered that the metal and ceramic constituents used to formulate my improved coatings may be classified in general under the first three of the six systems of crystallization outlined in W. E. Ford's fourth edition of Dana's Textbook of Mineralogy. These include the isometric, tetragonal and hexagonal systems. Also, that the majority of the available materials fall in the normal class of each system which contains crystals exhibiting the highest degree of symmetry. Some exceptions are apparent for materials in the hexagonal system where materials lower in grade of symmetry have been effectively used. These include some classed as hemimorphic, rhombohedral and trapezohedral. Materials in the orthorhombic and monoclinic systems have also been used as constituents to produce satisfactory compositions, but in all such cases the protective quality and life of the coating is reduced below those attainable in my better coatings. The space groups of the materials used to formulate my improved protective compositions as indicated by the symbols of the Shoenflies system in the X-Ray Crystallographic Data section of the Handbook of Chemistry and Physics, 31st edition, 1949, are as follows:

$$O_h^4, O_h^5, O_h^7, O_h^9, D_{4h}^{14}, D_{4h}^{19}, D_{6h}^2, D_{6h}^4, D_{3d}^6, D_3^4, C_{6v}^4, C_{2v}^{19}$$

and $$C_{2h}^3$$

Space groups for many complex minerals classified in Figures 1 and 1A according to function in Group 1 and space groups for some glass forming network materials in functional Group 4 are presently unknown or not readily available in published literature but it is believed that they can be identified with the crystallographic systems and classes as outlined.

In applying my discovery and invention to the formulation and production of my basic improved protective compositions, materials are usually selected from the first two or three groups tabulated in Figures 1 and 1A, applied to the metal or alloy to be coated and fired. Alterations and substitutions based on tests are then made, using, if necessary, other materials selected from any of the five groups on the basis of similar crystal space grouping, until the optimum protective layer for the particular purpose is obtained. Excellent protection has been obtained with layers formulated with materials from two or more groups because tests indicate that all mixtures apparently combine upon firing to develop an atomic spacing, along an edge of the crystal lattice, the same, or nearly the same, as that along the edge of the crystal of the metal or alloy being coated.

Selection of materials used in coatings is in general governed by their functions outlined above in the brief description of the drawings, the environment in which protection is required, and the type of coating desired. For example, to increase adherence and thermal shock resistance of my protective compositions, I add a material selected from Groups 2A and 2B. To increase stability and durability I add specific ceramic compounds from Group 1 or materials from Group 3. To obtain more vitreous or impervious coatings I add materials from Groups 4 and 5. I can also control the properties of coatings by selecting and adding materials from any group to produce chemical resistance; coatings which do not attack the base metal or oxidation and corrosion resistant coatings to fit most engineering requirements. When necessary or desirable, I limit oxide formation on the base material by controlling the furnace firing atmosphere.

In the formulation of protective layers having specified properties for specific materials, in accordance with my invention, samples of the material to be protected may be used in sizes depending upon material availability. Samples 2 x 4 inches, 1½ x 3 inches and ½ x 1 inch are ordinarily used for metals and alloys. The materials to be used in the formulation of the protective layer are selected according to function and crystal space grouping from Figures 1A and 1B of the drawings. No special preparation such as fritting is required. The mixture need only be ground to the fineness required.

After mixing, water and a suspension agent are added, and the mixture milled to produce a slip of the fineness desired. Most of my formulations require only about one hour of milling, although the time may be more or less, depending upon the ingredients and their hardness. After milling, the slip is adjusted by adding or removing water to provide a viscosity suitable for dipping, spraying, or slushing onto the base material. Application by spraying is preferred because this method prevents beading and permits more uniform thickness. No special preparation of the metal or alloy to be protected is required, except that it be free of dirt, oil and excess scale, a condition readily obtained by sandblasting to mention one of several methods known to those skilled in the art.

After coating, the samples are furnace or air dried and then fired for a period of time and temperature dependent upon the base material and the mixture used and determined by experiment. Coatings are then checked for adherence and thermal shock resistance and tested. Mechanical bending and hammering are used to check adherence and water quenching to room temperature from 1600° F. to 2000° F. to determine thermal shock resistance. Compositions which exhibit desired properties under such treatment are then tested, using the tentative Air Materiel Command ceramic coating test which comprises 72 hours of alternate heating and air quenching and soaking at contemplated operating temperatures. Included are a cyclic heating period for fifteen minutes followed by an air quench every half hour for an eight hour period and then a sixteen hour soak repeated each day until seventy-two hours have been completed.

All compositions listed in the formula chart, Figures 2A and 2B, are useful in differing applications, and will pass at least five hours of this test. Additional protective life and other desired characteristics are obtained by substitution of materials in specific basic formulae and repeating the processing of coating, firing and testing in a manner well known to those skilled in the art, until compositions are determined, which will give the desired life and characteristics required for a specific application.

By way of specific example, composition S-5 of Figure 2 is an excellent basic mixture for the protection of metals and alloys, and when formulated in accordance with my invention may consist of the following materials in parts by weight:

| Beryl | Si | SiC |
|-------|----|----|
| 2 | 1 | 1 |

These materials are mixed with a suitable quantity of water and a suspension or thickening agent, such as citric acid, $Ca(NO_3)_2$, methyl cellulose, or the sodium salt of polymerized d-mannuronic acid known as Kelgin LV, and milled to a fineness suitable for spraying, dipping, slushing or brushing, depending upon the application and the thickness of the coating required or desired. The resulting slip is then applied to the prepared metal, for example, A. I. S. I. (S. A. E.) No. 1010 steel and fired at a temperature of about 2200° F. for about 10 minutes. The suspension agent used is not critical and may be any water soluble dispersing agent known to those versed in the ceramic arts which produce hard, tough and flexible films on drying. Firing time and temperatures vary and depend upon size of sample, gauge, etc.

A controlled atmosphere firing of the coating results in a smoother, better coating than otherwise and for some applications is quite important. For control, depending upon the base material coated, a slightly oxidizing, neutral, or reducing atmosphere may be used or the furnace atmosphere diluted with an inert gas. In some cases, better results are obtained in ordinary furnaces by using a suitable metal container or box to enclose the coated part and flushing the box with inert gas during firing. Although any inert gas appears to give satisfactory results for control purposes, I prefer to use nitrogen because of ready avaliability and lower cost. While the end result is a combination of coating formula and atmosphere, the firing technique or coating composition may be easily altered to fit practically all furnace conditions by those skilled in the art, and permits satisfactory coatings to be applied to any of the rapidly oxidizable metals without the coatings spalling, fishscaling or blistering. With proper control, the thickness of normal metal or alloy oxides may be limited to provide a better, more uniform surface bond. For rapidly oxidizable metals, such as molybdenum, iron, "Hastelloy B" (a Haynes Stellite Company alloy whose nominal composition is Ni 65.1%, Mo 28.6%, Fe 4.7%, C .05%, Mn .59%, and Si .19%), etc., the normal oxide is kept to a minimum during the firing, otherwise the coating will spall or flux off.

The above formula is, of course, merely illustrative and the ranges and ceramic materials may be varied widely. For example, oxidation tests with iron as the base material at 1600° F. for extended periods show that satisfactory oxidation resistance and adherence is obtained using coating S-5 throughout the following ranges by weight:

| Beryl | Si | SiC |
|-------|----|----|
| 5-50% | 40-95% | 0-35% |

As will be seen from the charts, Figures 1, 1A, 2 and 2A, certain substitutions may be made in this formula, provided the crystal space groups are the same, or nearly the same, preferably those in the same class or those that exhibit the next lowest order of symmetry. As an example, nickelous oxide or cobaltic oxide may be substituted for silicon, and zinc oxide or beryllium oxide may be substituted for silicon carbide. Since the available crystalline space group and crystallographic data of complex ceramic compound similar to beryl is limited, the full range of substitute materials cannot presently be selected on the basis of crystal space lattice, but I have determined by experiment and test that mullite ($3Al_2O_3.2SiO_2$), potassium feldspar ($K_2O.Al_2O_3.6SiO_2$), zinc zirconium silicate ($ZnO.ArO_2.SiO_2$) and others listed in the complex mineral Group 1, Figure 1, may be used.

I have also determined that the wide range of ceramic substitutions permits some contamination and variations in the grades of the materials to be used without resultant deterioration of coating. For example, thin, strong, tightly adhering, thermal shock resistant compositions have been developed by using reagent, chemically pure, technical and commercial grade materials. This latitude does much to simplify the control and formulation of my improved protective compositions for specific uses. In addition, by proper selection of materials, those who are familiar with the ceramic art can alter firing times and temperatures to meet specific conditions. For the compositions disclosed herein, it has been determined that the firing time will vary from two to twenty minutes and firing temperature from 1500° F. to 2600° F., as indicated for some compositions in the tabulation of Figure 3.

The wide range of acceptable materials permits my basic protective compositions to be altered to develop more or less refractoriness, more vitreous impervious surfaces, and resistance to chemical attack by the proper selection of ceramic materials. I have also discovered that my improved basic compositions may be combined and/or fired in various combinations.

For example, I have discovered that a more impervious composition than coating S-5 results by the addition of one part by weight of titanium dioxide, which does not detract from the basic coating qualities. Such a more impervious composition (S-7 of Figure 2) by way of example consists essentially of the following parts by weight:

| Beryl | Si | SiO | TiO$_2$ |
|---|---|---|---|
| 2 | 6 | 1 | 1 |

These materials are mixed, applied and fired in the same manner as the basic ceramic mixture, except that firing for five minutes at a temperature of 2200° F. is required.

I have also found that tin oxide or zircon may be substituted for the titanium dioxide since they are of the same crystal class. I have also discovered that many other additions of refractory materials or metals may be made in or to the formula. These include tantalum nitride, chromium, cobalt, or combinations of metals and ceramics. In the substitution or addition of metals, I have determined that the best results are obtained if the metal added forms an oxide of high melting point of suitable crystal space group that will fit the composition.

A more vitreous coating can be obtained by including known glass network formers of proper crystal space group and the addition of a flux or so-called glass modifier of proper crystal space group. Tests show that if a coating formula is compounded to included $SiO_2$, $P_2O_5$, or $B_2O_3$, along with other ceramics selected according to my invention and discovery and lithium fluoride, sodium fluoride, or potassium fluoride are added, a glassy or vitreous surface is formed. A typical example is coating S-28 (Figure 2A) which consists essentially of the following parts by weight:

| Beryl | ZrO$_2$ | SiO$_2$ | B$_2$O$_3$ | BeO | LiF | NaF |
|---|---|---|---|---|---|---|
| 8 | 2 | 8 | 2 | 2 | 1 | 2 |

These materials are mixed, applied and fired in the same manner as the basic ceramic mixture, and fired for five minutes at a temperature of 2150° F.

As shown by the charts, LiF and NaF belong in the $$C_h^5$$

crystal space group, but I have found by test that ceramics with crystal space group $$D_{4h}^{14}$$

may also be added or substituted therefor. This group includes $MoO_2$ which appears to react in a manner similar to modifiers, and produce more vitreous compositions.

My improved basic and vitreous compositions are extremely flexible and may be applied and fired (1) directly on metals and their alloys, (2) successively as base and top coating, (3) together, or (4) may be mixed together and applied and fired. Typical examples of these combinations follow:

Coating S-12 (Figure 2) consists essentially of the following parts by weight:

| Beryl | Si | Al$_2$O$_3$ | BeO | TiO$_2$ |
|---|---|---|---|---|
| 8 | 4 | 8 | 2 | 6 | and coating S-28 (Figure 2A) consists essentially of the following parts by weight:

| Beryl | ZrO$_2$ | SiO$_2$ | B$_2$O$_3$ | BeO | LiF | NaF |
|---|---|---|---|---|---|---|
| 8 | 2 | 8 | 2 | 2 | 1 | 2 |

(1) Both may be applied and fired directly on metals and their alloys to produce satisfactory protection compositions (2) or S-12 may be applied and fired as a base, and then S-28 applied and fired as a top coating, (3) or S-12 may be applied and then S-28 applied and both fired together, (4) or S-12 may be mixed with S-28 to produce coating S-40 consisting essentially of the following parts by weight:

| Beryl | Si | ZrO$_2$ | SiO$_2$ | B$_2$O$_3$ | Al$_2$O$_3$ | BeO | TiO$_2$ | LiF | NaF |
|---|---|---|---|---|---|---|---|---|---|
| 16 | 4 | 2 | 8 | 2 | 8 | 4 | 6 | 1 | 2 | which is applied and fired as a single coating.

These examples are merely illustrative and by no means limit the application, mixing and firing technique to that described.

The basic concept and wide range of ceramic materials and compounds, which can be used in coating formulation, permits more refractory single protecting compositions to be mixed or highly refractory top compositions to be added in a manner somewhat similar to that used for vitreous coatings. For example, the refractoriness of coating S-8 which consists essentially of the following parts by weight:

| Beryl | Co$_3$O$_4$ | BeO | TiO$_2$ |
|---|---|---|---|
| 12 | 6 | 6 | 6 | may be increased by adding a top layer of coating S-8TI which consists essentially of the following parts by weight:

| ZrO$_2$ | SiO$_2$ | Al$_2$O$_3$ | BeO |
|---|---|---|---|
| 5 | 1 | 2 | 10.5 |

These coatings may be applied and fired using the same technique as that for developing more vitreous coatings, except that some highly refractory top coatings cannot be fired directly upon the metal or alloy.

The chemical resistance of the materials that may be used in coating formulation also permits formulation of compositions in accordance with my invention with added chemical resistance and without deterioration in basic composition properties. For example, by incorporating only acid resistant materials in the coating, high temperature, acid resistant compositions may be fired on metals and alloys to provide base material protection.

My improved compositions may also be fritted in a manner similar to that used in the enamel art, by mixing and smelting at temperatures from 1700° F. to 3000° F. until maturity is indicated by the ability to draw a smooth glass thread from the batch. The smelt is then quenched by pouring it into water and then it is dry or wet ground to the fineness desired for spraying, dipping or slushing. This process imparts more uniformity and higher refractoriness to some coatings, but is seldom required and is described to illustrate the wide flexible range of inherent mixture properties when the coatings are formulated by selection of materials in accordance with my invention and discovery.

All of the numerous formulations in accordance with my invention and discovery so far tested give improved protective results on all metals and alloys so far tried. Lack of time and facilities have prevented the testing of all available metals and alloys with my protective coatings. However, tests conducted over the past several years show that by the proper selection of materials in accordance with my invention and discovery, protective layers may be speedily formulated and fired on metals and alloys to meet the most exacting requirements. To date, layers of protective composition have been produced for truck exhaust manifolds, burner cups, gas turbine combustion chamber liners, transition liners, nozzle diaphragms, gas turbine and compressor blades, rocket motors, and ram jets. Metals and alloys, including molybdenum, tungsten, tantalum, S. A. E. steels 1010, 1020, 4130, and 6323, Stainless steels Standard Type Nos. 403, 430, 501, 302, 321, 347, 310 and 314, Inconel (Ni 80%, Cr 14%, Fe 6%), Vitallium (Cr 25%, Co 69%, Mo 6%, C .24%) and Hastelloy B (Ni 65.1%, Mo 28.6%, Fe 4.7%, C .05%, Mn .59%, Si .19%) have all been successfully protected by improved compositions, and the experience so far had with the foregoing wide variety of metals, alloys and articles subjected to very high temperatures indicates that satisfactory protecting composition for many other metals, alloys and services can be formulated in accordance with my methods herein disclosed. Also by my invention tightly adhering, thermal shock resistant, vitreous protective surface layers may be produced on carbon, graphite, titanium carbide, silicon carbide and the like.

A partial list of the base materials, compositions used, firing times and temperatures, composition thicknesses, and Air Materiel Command (A. M. C.) data is given in the tabulation of Figure 3 of the drawings.

It will accordingly be seen that materials with the foregoing properties, selected and applied to the base materials in accordance with my invention, combine to form thin, flexible, tightly adhering, protective layers that materially extend the normal life of metals or alloys at temperatures, and in corrosion and oxidation environments which produce rapid failure of the unprotected base material, and open vast new possibilities of mechanical design and improvement in high temperature equipment. The best of these compositions are applied in very thin layers of the order of .0005 to .003 of an inch, have a wider latitude of coating formulation, better adherence, better mechanical and thermal shock resistance, and have other desirable properties heretofore unobtainable with prior enamels and ceramic coatings.

This application is a continuation of pending application S. N. 133,045, filed December 15, 1949 for Compositions of Matter and Methods of Their Production, now abandoned.

Certain terminology used in the claims is defined as follows: (1) The expression in the claims of "materials in Group 1," and like expressions relating to Groups 2, 3, 4 and 5, refer respectively to all the materials listed in corresponding Groups 1, 2, 3, 4 and 5 in Figures 1 and 1–A of the drawings in this application (and such equivalents thereof as may fairly fall within applicant's disclosure under the patent law doctrine of equivalents). (2) The word "essential" used in the third last clause of process claims numbers 12–17 is not intended to include mill additions.

The terms "fire bonded" and "firing" used in the claims are not limited to heating the base metal and ceramic coating through the direct application of fire to bond the coating to the base metal, but include also indirect heating, as for example, heating in a furnace or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An article of manufacture comprising a metallic body having a crystalline structure, and a ceramic coating having a continuous surface consisting essentially of a crystalline or crypto-crystalline structure fire bonded on said body, said coating having a crystalline interlocked permanent bond with said metallic body.

2. An article of manufacture comprising: a metallic body having a crystalline structure; a ceramic coating having a continuous surface consisting essentially of a crystalline or crypto-crystalline structure fire bonded on said body; and a laminar zone of interdiffused particles of base metal and ceramic coating at the interface between said coating and body.

3. An article of manufacture comprising: a metallic body having a crystalline structure with at least its principal constituent having unit cells of the cubic and hexagonal classes; a ceramic coating having a continuous surface consisting essentially of a crystalline or crypto-crystalline structure fire bonded to said body, said coating consisting of at least two materials having a crystal structure of the cubic, hexagonal and tetragonal classes; and a laminar zone of interdiffused crystals of base metal and ceramic coating at the interface between said ceramic coating and metallic body.

4. An article of manufacture comprising: a metallic body having a crystalline structure; a ceramic coating having a continuous surface consisting essentially of a crystalline or crypto-crystalline structure fire bonded to said body, said coating consisting of at least two materials each from the group consiting of those having the space groupings of $$O_h^4, O_h^5, O_h^7, O_h^9, D_{4h}^{14}, D_{6h}^2, D_{3h}^6, D_{3d}^6, D_3^4, C_{6V}^4, C_{2V}^{19}$$

and $$C_{2h}^3$$

according to the Shoenflies system of identification; and a laminar zone of interdiffused crystals of base metal and ceramic coating at the interface between said ceramic coating and metallic body.

5. An article of manufacture comprising: a metallic body having a crystalline structure; a ceramic coating having a continuous surface consisting essentially of a crystalline or crypto-crystalline structure fire bonded to said body, said coating consisting of at least two materials; one of said two materials being from one of Groups 1, 2, 3, 4 and 5 of Figures 1 and 1-A, and the other of said two materials being from one of the other 3 of said groups; and a laminar zone of interdiffused crystals of base metal and ceramic coating at the interface between said ceramic coating and metallic body.

6. An article of manufacture as defined in claim 1, wherein the total thickness of said coating and laminar zone is less than 0.003 of an inch.

7. An article of manufacture comprising: a metallic body having a crystalline structure; a ceramic coating having a continuous surface consisting essentially of a crystalline or crypto-crystalline structure fire bonded on said body; and a laminar zone of interdiffused particles of base metal and ceramic coating at the interface between said coating and body; said coating consisting principally of one or more ingredients having a crystal structure of the cubic, hexagonal and tetragonal classes with an atomic lattice spacing that is substantially an integer of the lattice spacing of the principal material of said metal body.

8. An article of manufacture comprising: a metallic body having a crystalline structure with at least its principal constituent having unit cells of the cubic and hexagonal classes; and a ceramic coating having a continuous surface consisting essentially of a crystalline or crypto-crystalline structure fire bonded to said body, said coating consisting of at least two materials having a crystal structure of the cubic, hexagonal and tetragonal classes, said coating having a crystalline interlocked bond with said metallic body.

9. A process of ceramic coating a metallic base that has a crystalline structure with at least its principal constituent having unit cells of the cubic and hexagonal classes, comprising the steps of: compounding into a slip as principal ingredients thereof a mixture of at least two materials each having a crystalline structure with unit cells of the cubic, hexagonal and tetragonal classes; applying said slip to said metallic base; and firing it until a ceramic coating consisting essentialy of a crystalline or crypto-crystalline structure is permanently bonded thereon.

10. A process of coating a metallic base with a ceramic coating of crystalline or crypto-crystalline structure comprising the steps of: compounding into a slip as principal ingredients thereof a mixture of at least two materials, one of said materials being selected from one of Groups 1, 2, 3, 4 and 5 in Figures 1 and 1-A and the other of said materials being selected from one of the others of said groups; applying a layer of said slip to said metallic base; and firing it until a ceramic coating consisting essentially of a crystalline or crypto-crystaline structure is permanently bonded thereon.

11. A process of ceramic coating a metallic base that has a crystalline structure with at least its principal constituent having unit cells of the cubic and hexagonal classes, comprising the steps of: compounding into a slip as principal ingredients thereof a mixture of at least two materials each having a crystalline structure with a space lattice of the $$O_h^4, O_h^5, O_h^7, O_h^9, D_h^{14}, D_h^{19}, D_{6h}^2, D_{3d}^6, D_3^4, C_{6V}^4, C_{2V}^{19}$$

and $$C_{2h}^3$$

classes according to the Shoenflies system of identification; applying said slip to said metallic base; and firing it until a ceramic coating consisting essentially of crystalline or crypto-crystalline structure is permanently bonded thereon.

12. A process of ceramic coating a metallic base comprising the steps of: compounding a protective coating composition consisting essentially of about 6-20 parts by weight of one or more ingredients selected from the materials in Group 1; about 0-24 parts by weight or more ingredients selected from the materials in Group 2; about 4-22½ parts by weight of one or more ingredients selected from the materials in Group 3; about 0-14 parts by weight of one or more ingredients selected from the materials in Group 4; and about 0-8 parts by weight of one or more ingredients selected from the materials in Group 5; making a slip including said composition as the essential component thereof; applying said slip to said base; and firing it to form a ceramic coating on said base.

13. A process of ceramic coating a metallic base comprising the steps of: compounding a protective coating composition comprising a mixture consisting essentially of about 8-20 parts by weight of one or more ingredients selected from the materials in Group 1; about ⅜-6 parts by weight of one or more ingredient sselected from the materials in Group 2; about 5-22½ parts by weight of one or more ingredients selected from the materials in Group 3; about 2-10½ parts by weight of one or more ingredients selected from the materials in Group 4; and about 1-7 parts by weight of one or more ingredients selected from the materials in Group 5; making a slip including said composition as the essential component thereof; applying said slip to said base; and firing it to form a ceramic coating on said base.

14. A process of ceramic coating a metallic base comprising the steps of: compounding a protective coating composition comprising a mixture consisting essentially of about 6-12 parts by weight of one or more ingredients selected from the materials in Group 1; about 4-12 parts by weight of one or more ingredients selected from the materials in Group 3; about 4-14 parts by weight of one or more ingredients selected from the materials in Group 4; and about 1-8 parts by weight of one or more ingredients selected from the materials in Group 5; making a slip including said composition as the essential component thereof; applying said slip to said base; and firing it to form a ceramic coating on said base.

15. A process of ceramic coating a metallic base comprising the steps of: compounding a protective coating composition comprising a mixture consisting essentially of about 8 parts by weight of one or more ingredients selected from the materials in Group 1; about 4-24 parts by weight of one or more ingredients selected from the materials in Group 2; and about 4-16 parts by weight of one or more ingredients selected from the materials in Group 3; making a slip including said composition as the essential component thereof; applying said slip to said base; and firing it to form a ceramic coating on said base.

16. A process of ceramic coating a metallic base comprising the steps of: compounding a protective coating composition consisting essentially of about 8-12 parts by weight of one or more ingredients selected from the material in Group 1; about ½-8 parts by weight of one or more ingredients selected from the materials in Group 2; about 16-23 parts by weight of one or more ingredients selected from the materials in Group 3; and about 8-14 parts by weight of one or more ingredients selected from the materials in Group 5; making slip including said composition as the essential component thereof; applying said slip to said base; and firing it to form a ceramic coating on said base.

17. A process of ceramic coating a metallic base comprising the steps of: compounding a protective coating composition consisting essentially of about 8 parts by weight of one or more ingredients selected from the materials in Group 1; and about 20 parts by weight of one or more ingredients selected from the materials in Group 3; making a slip including said composition as the essential component thereof; applying said slip to said base; and firing it to form a ceramic coating on said base.

18. A protective coating composition comprising a mixture consisting essentially of about 8-20 parts by weight of one or more ingredients selected from the materials in Group 1; about ⅜-6 parts by weight of one or more ingredients selected from the materials in Group 2; about 5-22½ parts by weight of one or more ingredients selected from the materials in Group 3; about 2-10½ parts by weight of one or more ingredients selected from the materials in Group 4; and about 1-7 parts by weight of one or more ingredients selected from the materials in Group 5.

References Cited in the file of this patent

UNITED STATES PATENTS

| | | |
|---|---|---|
| 2,040,215 | Rava | May 12, 1936 |
| 2,300,454 | Lucas | Nov. 3, 1942 |
| 2,311,039 | Emery | Feb. 16, 1943 |
| 2,321,763 | McIntyre | June 15, 1943 |
| 2,337,521 | Cooper | Dec. 21, 1943 |
| 2,391,468 | Long | Dec. 25, 1945 |
| 2,467,114 | Deyrup | Apr. 12, 1949 |
| 2,475,469 | Bennett et al. | July 5, 1949 |

FOREIGN PATENTS

| | | |
|---|---|---|
| 121,628 | Australia | June 24, 1956 |